US007687943B2

(12) United States Patent
Lunde (10) Patent No.: US 7,687,943 B2
(45) Date of Patent: Mar. 30, 2010

(54) ELECTRICITY GENERATING WHEEL SYSTEM

(76) Inventor: Doug Lunde, N7053 Morgan Rd., Oconomowoc, WI (US) 53066

( * ) Notice: Subject to any disclaimer, the term of this patent is extended or adjusted under 35 U.S.C. 154(b) by 198 days.

(21) Appl. No.: 11/869,455

(22) Filed: Oct. 9, 2007

(65) Prior Publication Data
US 2008/0093955 A1 Apr. 24, 2008

Related U.S. Application Data

(60) Provisional application No. 60/852,756, filed on Oct. 19, 2006.

(51) Int. Cl.
*H02K 41/00* (2006.01)
*F02B 63/00* (2006.01)
(52) U.S. Cl. .............................. 310/15; 310/36; 310/58; 310/75 C; 290/1 R
(58) Field of Classification Search ............. 310/12–15, 310/36, 75 C, 52, 58–60 A; 290/1 R
See application file for complete search history.

(56) References Cited

U.S. PATENT DOCUMENTS

| 3,767,909 | A | * | 10/1973 | Bell | 362/500 |
| 4,062,421 | A | | 12/1977 | Weber | |
| 4,065,189 | A | | 12/1977 | Sikorra | |
| 4,179,633 | A | | 12/1979 | Kelly | |
| 4,405,872 | A | | 9/1983 | Thomas | |
| 4,827,163 | A | * | 5/1989 | Bhate et al. | 310/15 |
| 4,912,343 | A | | 3/1990 | Stuart | |
| 6,125,955 | A | | 10/2000 | Zoretich et al. | |
| 6,291,901 | B1 | * | 9/2001 | Cefo | 290/1 R |
| 6,914,351 | B2 | * | 7/2005 | Chertok | 310/12.26 |
| 6,977,454 | B2 | | 12/2005 | Hsu | |
| 2001/0004174 | A1 | | 6/2001 | Gallant | |
| 2004/0183387 | A1 | | 9/2004 | Moe | |

* cited by examiner

*Primary Examiner*—Tran N Nguyen
(74) *Attorney, Agent, or Firm*—Absolute Technology Law Group LLC (57) ABSTRACT

An system and apparatus for capturing electricity comprised of: a wheel and a fixed conducting rod, both in electrical contact with the wheel and at least one electrical component or system in which the wheel is rotatable about an axis. The wheel is comprised of: a rotatable hub; a rotatable conducting rod within the rotatable hub; at least one electricity generating device positioned on the hub and comprised of: a generally hollow housing having a distal end and a proximate end; a wire coil fixed within the housing and having an axial bore therethrough; a translatable magnet; and at least one wire in electrical contact with the wire coil and the rotatable hub; wherein as the wheel is rotated, the translatable magnet laterally translates back and forth within the housing and passing through the wire coil to generate the electric current.

19 Claims, 13 Drawing Sheets

ELECTRICITY GENERATING WHEEL SYSTEM

CROSS-REFERENCE TO RELATED APPLICATION

This application claims the benefit of and priority to U.S. provisional application Ser. No. 60/852,756, filed on 19 Oct. 2006 and incorporated herein in its entirety.

FIELD OF THE INVENTION

This invention relates generally to the field of generating electromagnetic energy; and more specifically to the generation of an electromagnetic current by rotating a wheel in which a magnet laterally translates through a coil when the wheel is rotated.

BACKGROUND OF THE INVENTION

The present invention relates to apparatuses and methods for the production of electromagnetic fields and for interrupting and controlling such fields, and to the production of such fields for generating electricity and providing energy to electric components of a vehicle.

It is well known in the art that any change in the magnetic environment of a coil of wire will cause a current to be induced in the coil. The change to the magnetic environment could be produced by changing the magnetic field strength, moving a magnet toward, away from, through, or around the coil, moving the coil into or out of the magnetic field, rotating the coil relative to the magnet, etc. Thus, by intentionally manipulating the magnetic field of a wire coil, i.e., the passing of a magnet through a wire coil (or vice versa), an electric current can be generated.

The prior art includes a flashlight that is powered by a magnet, which slides back and forth inside the flashlight handle. As it does so, it passes through a copper coil, thereby inducing a current in the coil's wire. This current is then stored inside a capacitor which in turn provides power to an LED (light emitting diode) or incandescent bulb.

The prior art has not, however, applied this technology to the automotive industry, and more specifically to provide all of or supplement the power available to a vehicle, whether operating the vehicle itself or running all or a portion of the electrical components of the vehicle. Nor has the prior art applied the technology more generally to any rotating device to capture otherwise wasted energy.

As used herein, the term "wheel" refers to any rotatable object, including but not limited to a car tire, truck tire, motorcycle tire, moped tire, ATV tire, or any other vehicle tire, bicycle tire, sprocket, or axle, as well as part of any other rotating or spinning device such as a windmill, fan, waterwheel, paddlewheel, propeller, pedal-driven wheels, and combinations thereof.

As used herein, the term "fluid" refers to any substance that is capable of flowing, whether a liquid, gas, slurry of liquids and solids, liquids and gasses, aerosols, and combinations of liquids, gasses, and solids.

As used herein, the term "biasing member" refers to any object or construction that slows down, accelerates, or stops the translatable magnet from maintaining its position within the electricity generating device. Examples of biasing members include flexible tubes, levers, springs (including star springs with a memory, sponges, geo springs), fluid pressure, pressure sensitive devices, electronic devices adapted to receive pressure input, one or more magnets, and combinations thereof.

As used herein, the term "repelling magnet" or "opposing magnet" means a magnet which counters centrifugal force.

As used herein, the term "magnet" shall refer to any material or object that produces a magnetic field, either natural or induced, examples of which include but are not limited to anistotropic sintered ceramic containing neodymium and boron (NeB) or neodymium, iron, and boron (NeFeB), a samarium-cobalt (SmCo) magnet, a sintered rare earth magnet, a sintered hard ferrite/ceramic bonded magnet, an alnico magnet (an Al/Ni/Co alloy), a ceramic magnet, flexible magnets, magnet assemblies, or any other magnet capable of generating a magnetic field.

As used herein, the terms "translate" and "translatable" shall refer to movement between two points, without angular displacement.

As used herein, the term "hub" shall refer to the central or center part of a wheel, around which other components of the wheel revolve, i.e., the point or points where the movable portion(s) of the device meet the non-movable portion(s).

DETAILED DESCRIPTION OF EMBODIMENTS OF THE INVENTION

For the purpose of promoting an understanding of the present invention, references are made in the text hereof to embodiments of an electricity generating device and wheel system, only some of which are depicted in the figures. It should nevertheless be understood that no limitations on the scope of the invention are thereby intended. One of ordinary skill in the art will readily appreciate that modifications such as the dimensions, shape, location, and number of the components, alternate but functionally similar materials from which the electricity generating device and system is made, and the inclusion of additional elements are deemed readily apparent and obvious to one of ordinary skill in the art, and all equivalent relationships to those illustrated in the drawings and described in the written description do not depart from the spirit and scope of the present invention. Some of these possible modifications are mentioned in the following description. Therefore, specific details disclosed herein are not to be interpreted as limiting, but rather as a basis for the claims and as a representative basis for teaching one of ordinary skill in the art to employ the present invention in virtually any appropriately detailed apparatus or manner.

It should be understood that the drawings are not necessarily to scale, emphasis instead being placed upon illustrating the principles of the invention. In addition, in the embodiments depicted herein, like reference numerals in the various drawings refer to identical or near identical structural elements.

Moreover, the term "substantially" or "approximately" as used herein may be applied to modify any quantitative representation that could permissibly vary without resulting in a change in the basic function to which it is related. For example, one embodiment of the electricity generating device and wheel system is disclosed herein as including a rolling magnet having substantially flat side surfaces. The side surfaces might permissibly be somewhat non-flat, e.g., concave or convex and still be within the scope of the invention if its functionality is not materially altered.

Figure 1:
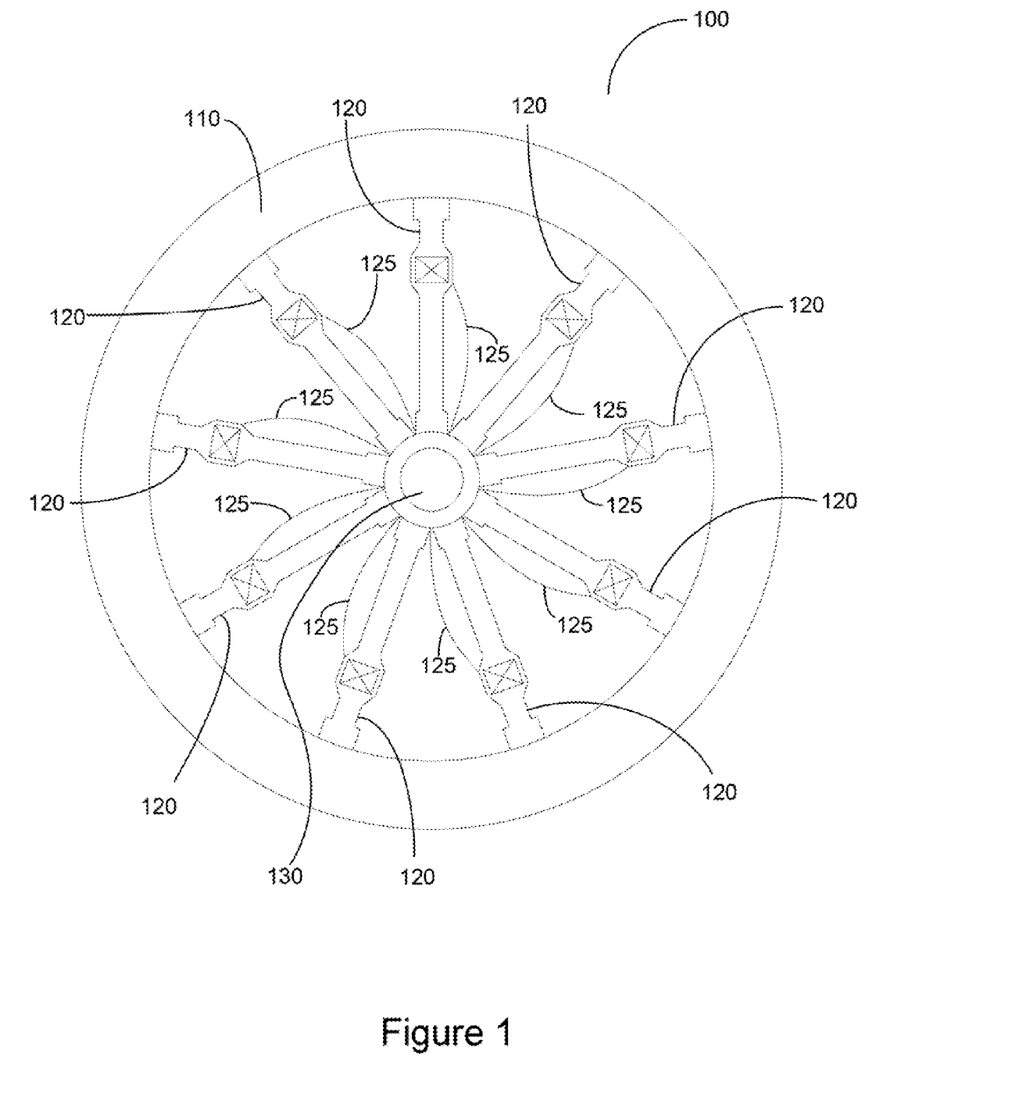
FIG. 1 is a side view of one embodiment of an electricity generating wheel.
Figure 2:
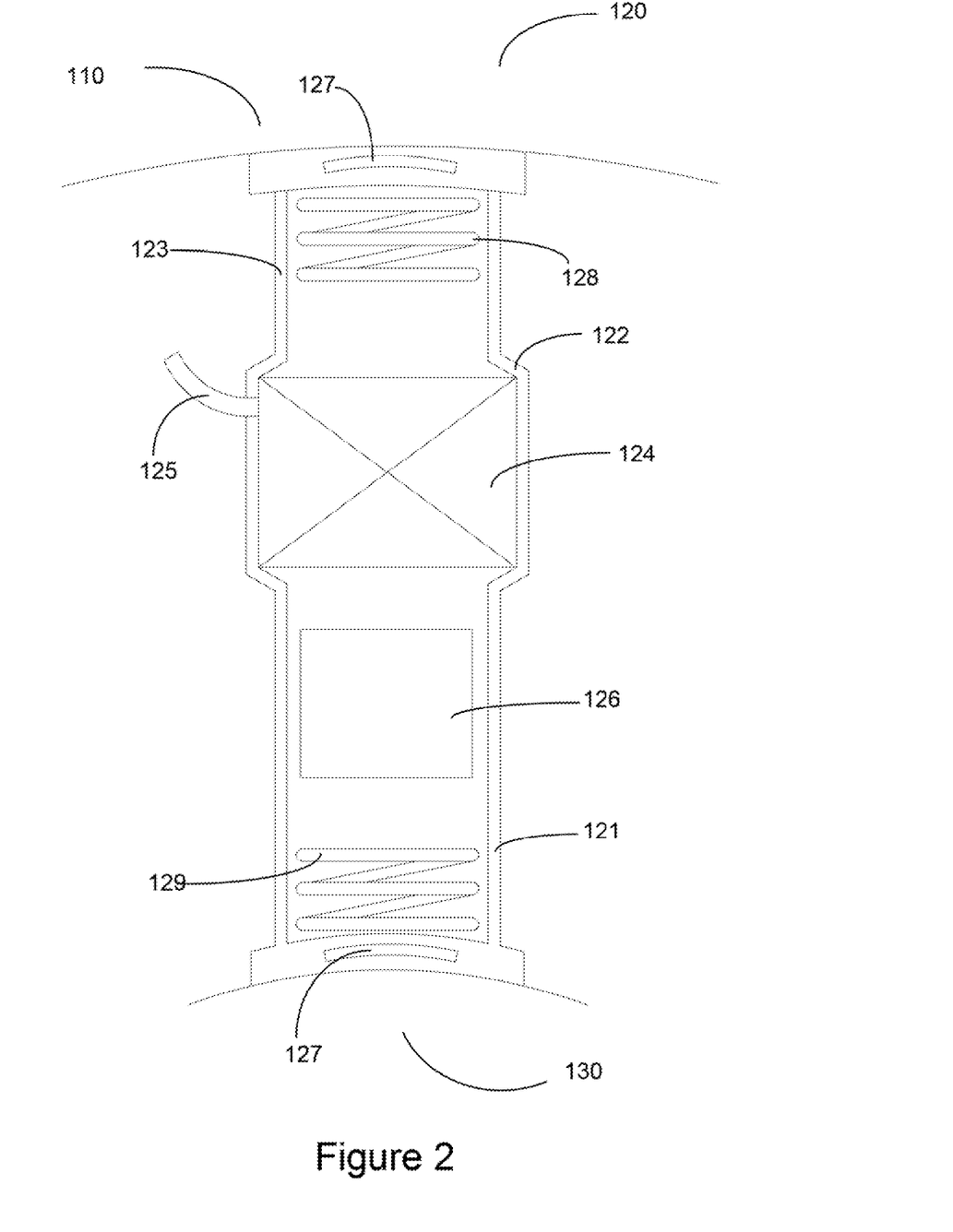
FIG. 2 is a cross-sectional view of one embodiment of one electricity generating device shown in FIG. 1, positioned as a spoke.

Referring now to the drawings, FIG. 1 is a side perspective view of one embodiment of an electricity generating wheel 100, and FIG. 2 is a cross-sectional view of one embodiment of electricity generating device 120 shown in FIG. 1. Specifically, wheel 100 is for use with an automobile, but the principles described herein can be used with any "wheel" system, as defined supra.

Referring to FIG. 1 and FIG. 2 collectively, the embodiment of electricity generating wheel 100 shown includes rim 110, to which a plurality of electricity generating devices 120 are affixed and on which a tire can be placed (not shown), and hub 130. Each electricity generating device 120 is placed along a spoke (not visible) and attached at first end 121 to hub 130 and attached at second end 123 to wheel rim 110. As can be seen in FIG. 2, each individual electricity generating device 120 is comprised of housing 122, wire coil 124, electrical wire 125, translatable magnet 126, and biasing members 128 and 129. As wheel 100 rotates, translatable magnet 126 travels through electricity generating device 120 within housing 122. Housing 122 is generally tubular and translatable magnet 126 is similarly shaped. However, as will be discussed in detail infra, housing 122 and translatable magnet 126 can have alternate shapes.

Figure 3:
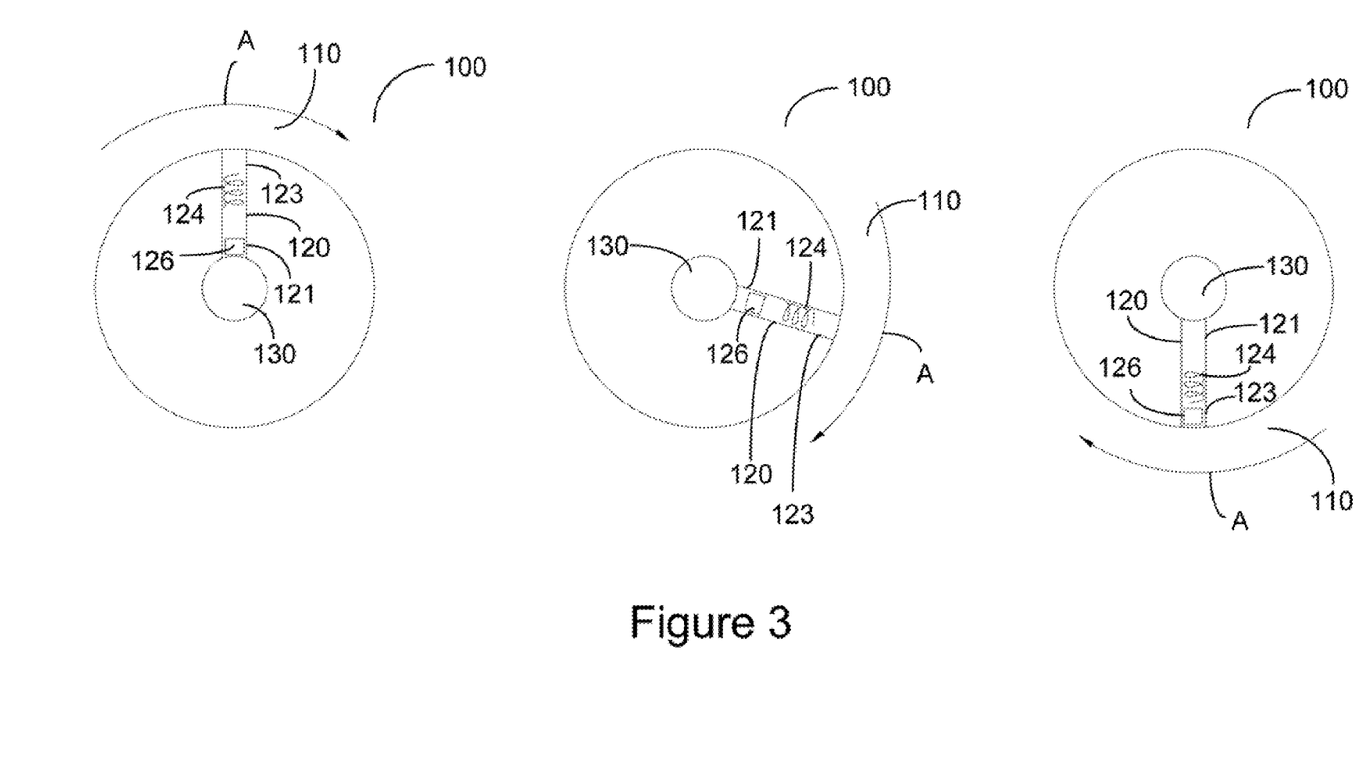
FIG. 3 shows a simplified version of the embodiment of the electricity generating device shown in FIGS. 1 and 2 in which the rotation of the electricity generating device and the movement of the magnet therethrough can be appreciated.

For example, referring to FIG. 3 in which only a simplified version of electricity generating device 120 is shown to demonstrate the movement of translatable magnet 126, electricity generating device 120 begins in the uppermost and vertical position. At the top of wheel 100, translatable magnet 126 is at the bottom of electricity generating device 120, i.e., at first end 121, closest to hub 130. As wheel 100 rotates clockwise (see arrow A), such that electricity generating device 120 is in the bottommost and again vertical position, translatable magnet 126 will "fall" along the length of electricity generating device 120, passing through coil 124, i.e., closest to rim 110. As wheel 100 continues to rotate back to its original position, translatable magnet 126 will again "fall" to its original position. In doing so, translatable magnet 126 again passes through coil 124, creating an electric current. The generated electric current passes through electrical wire 125 where it can be used by the vehicle (not shown), as described infra.

Referring again to FIG. 2, also included inside each electricity generating device 120 are biasing members 128 and 129. Biasing members 128 and 129 accelerate and decelerate translatable magnet 126 as it moves along the length of electricity generating device 120. In addition, at high rpm's because of centrifugal force, translatable magnet 126 may be pinned against second end 123 of electricity generating device 120. Biasing member 128 prevents this. In the embodiment shown, biasing members 128, 129 are each compression springs. However, in alternate embodiments, biasing members 128, 129 could be a flexible tube, a star spring with a memory, a sponge, a geo spring, a magnet, and combinations thereof. Moreover, biasing members 128, 129 need not be the same within the same electricity generating device 120. That is, for example, in one embodiment of electricity generating device 120, biasing member 129 is a compression spring, and biasing member 128 is a repelling magnet.

In addition, in the embodiment shown in FIG. 2, electricity generating device 120 further includes first repelling magnet 127 positioned in second end 123 of electricity generating device 120 and second repelling magnet 127' positioned in first end 121 of electricity generating device 120. Repelling magnets 127, 127' further aid in preventing translatable magnet 126 from being pinned against biasing member 128 at high rpm's. However, it should be understood that first repelling magnet 127 could also be positioned within rim 110 or need not be included at all and that second repelling magnet 127' could also be positioned within hub 130 or need not be included at all. That is, every embodiment of electricity generating device 120 need not include first repelling magnet 127 and/or second repelling magnet 127'.

As provided supra, wheel 100 and rim 110 can be part of a vehicle, bicycle, motorcycle, moped, truck, or any other vehicle, as well as part of any other rotating or spinning device such as a windmill, waterwheel, paddlewheel, and pedal-driven wheel as only examples. Rim 110 may be a standard rim or may contain special recessed portions or be of greater width to accommodate the components of the instant invention. Wheel 100 and rim 110 can be made of any material commonly used in the particular field, including any metal or alloy, wood, plastic, carbon composite, and combinations thereof. In the embodiment shown, wheel 100 is used with a car and wheel 100 and rim 110 are made of aluminum.

Electricity generating device 120 may similarly be made of any material, including any non-magnetic metal or alloy, wood, plastic, carbon composite, and combinations thereof and may be of any length or width necessary to achieve the electro-magnetic current generating design described herein. In the embodiment shown and described herein, electricity generating device 120 and housing 122 are made of aluminum. In addition, electricity generating device 120 can be structural or non-structural. That is, in the embodiment shown, electricity generating devices 120 are each positioned on a spoke and connected to hub 130 and rim 110, but are not the primary structural support for rim 110 and are only intended to generate electricity according to the instant invention or only supplement another structural support of rim 110, e.g., the spoke. However, in alternate embodiments, rim 110 can be supported by electricity generating devices 120. Furthermore, the embodiment shown includes nine (9) electricity generating devices 120. Alternate embodiments can include fewer or more electricity generating devices 120. In addition, in the embodiment shown, electricity generating wheel 100 is intended to be used with a vehicle and with three (3) other electricity generating wheels 100. Other electricity generating wheels 100 of the vehicle (not shown) could include fewer or more electricity generating devices 120 and can include a different number of electricity generating devices 120, i.e., each electricity generating wheel 100 need not include the same number of electricity generating devices 120 or each spoke need not include electricity generating device 120.

In addition, in the embodiment shown, electricity generating devices 120 are generally cylindrical, i.e., having a circular cross-section. However, in alternate embodiments of electricity generating wheel 100, electricity generating devices 120 could have a substantially non-circular cross-section, including square-shaped. In such an embodiment, the inner chamber of housing 122, wire coil 124, and translatable magnet 126 would likely have to be similarly shaped.

Moreover, as stated supra, housing 122 is generally hollow to accommodate the various components and allow translatable magnet 126 to pass therethrough. In the embodiment shown, air is also contained within electricity generating device 120. However, in alternate embodiments of electricity generating wheel 100 and electricity generating device 120, each electricity generating device 120 could be filled with another fluid or have a partial or complete vacuum, including combinations thereof, depending on the materials chosen, the use of electricity generating wheel 100, the strength of translatable magnet 126, and the desired resulting electric current to be generated.

Translatable magnet 126 may be any type of magnet including but not limited to an anistotropic sintered ceramic containing neodymium and boron (NeB) or neodymium, iron, and boron (NeFeB), a samarium-cobalt (SmCo) magnet, a sintered rare earth magnet, a sintered hard ferrite/ceramic bonded magnet, an alnico magnet (an Al/Ni/Co alloy), a ceramic magnet, flexible magnets, magnet assemblies, or any other magnet capable of generating a magnetic field. In the embodiment shown, translatable magnet 126 is a ferrite magnet.

In the embodiment shown, wire coil 124 is copper wire. However, alternate materials may be used which have the ability to conduct electric current in a manner generally consistent with copper. The voltage of the electricity generated is a function of the number of wires in wire coil 124. Thus, various voltages can be generated depending on the needs of the system being driven or supplemented by the electricity generated. In addition, the voltage can be enhanced by using a very strong translatable magnet 126 or using a larger number of electricity generating devices 120.

Figure 4:
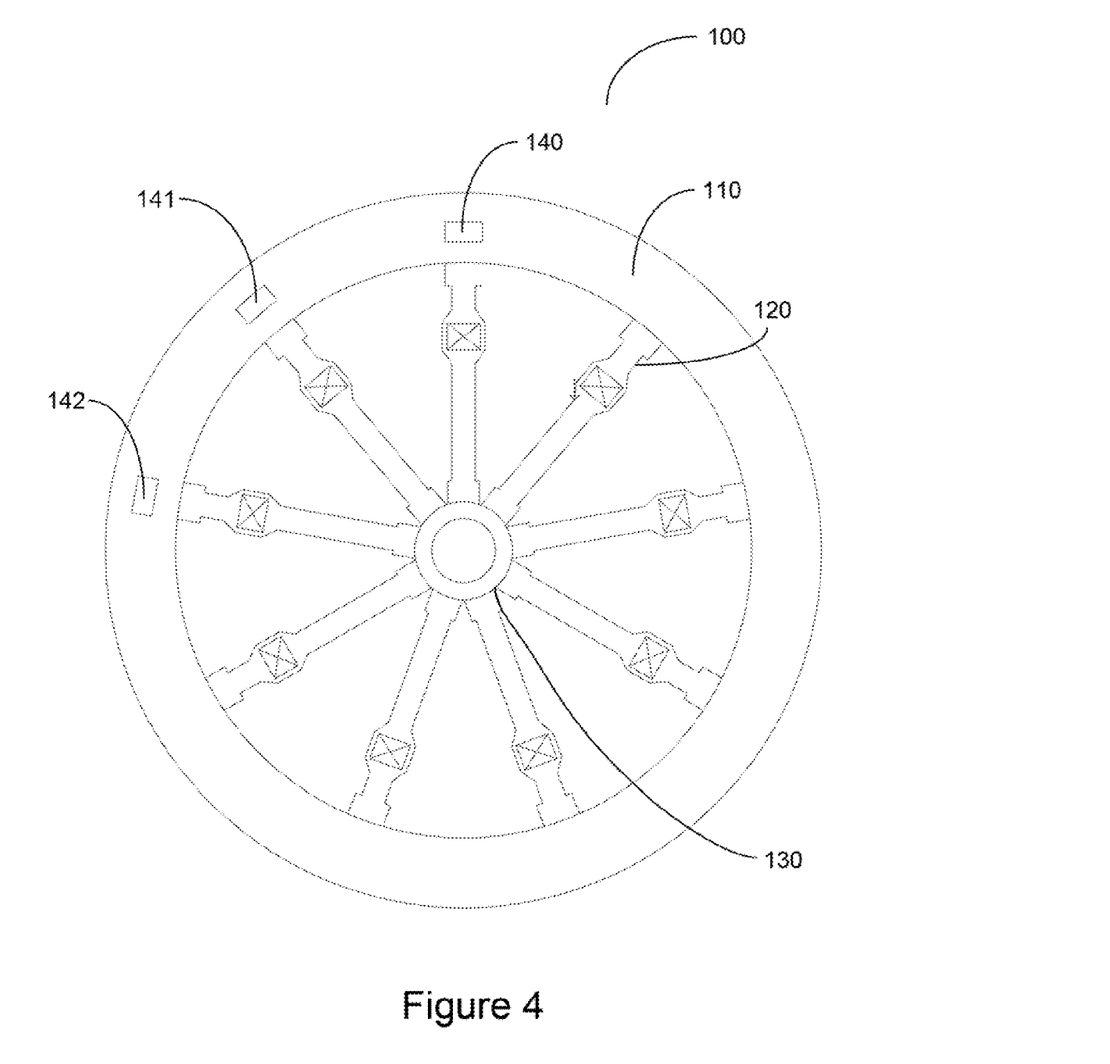
FIG. 4 shows an alternate embodiment of the electricity generating wheel in which multiple outer biasing members are positioned outside of the wheel.
Figure 5:
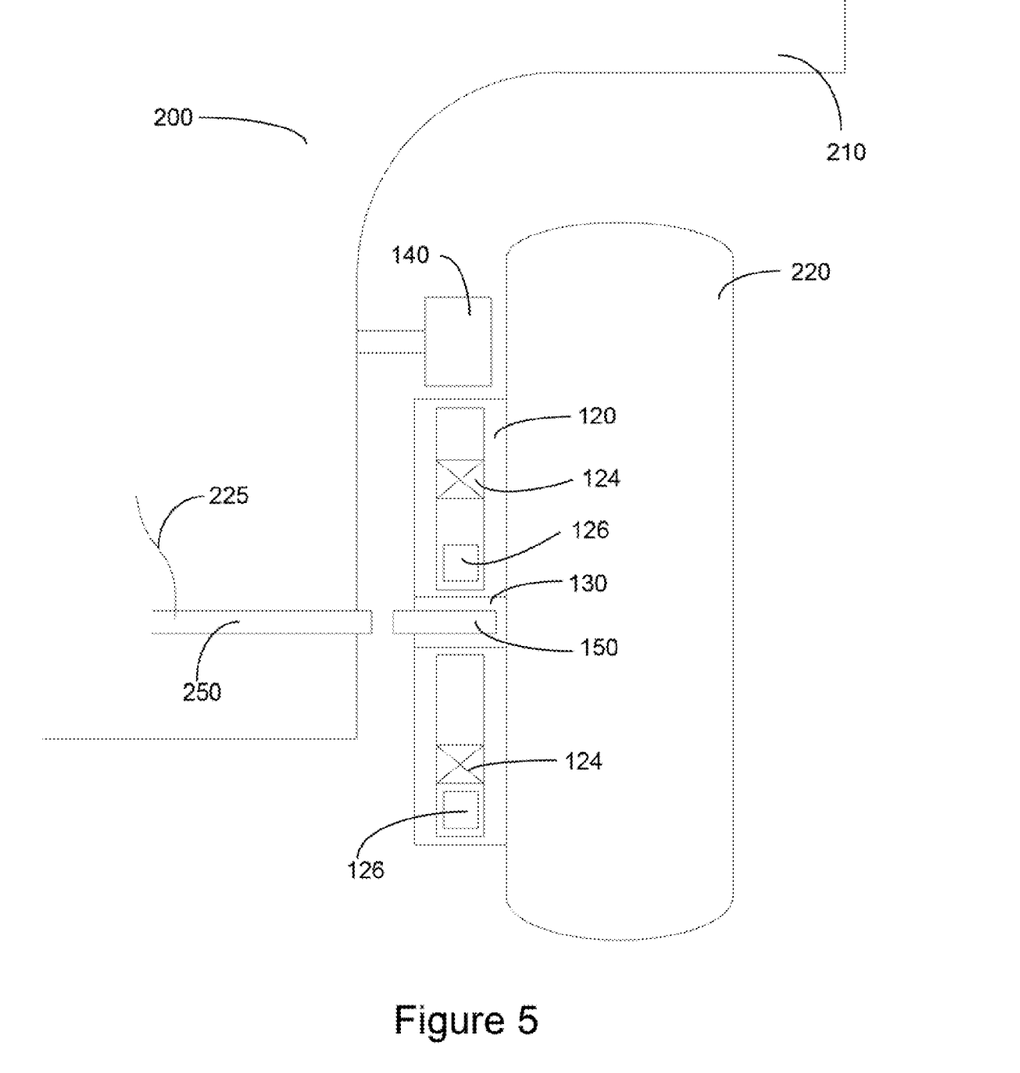
FIG. 5 is a front view of the embodiment of the electricity generating wheel shown in FIG. 4, taken along line 5.

FIG. 4 shows an alternate embodiment of electricity generating wheel 100 in which biasing member 140 is positioned outside of electricity generating wheel 100. In this embodiment biasing member 140 is part of car (as shown in FIG. 5) and is a ferrite magnet. Biasing member 140 repels translatable magnet 126 to compensate for centrifugal force when the vehicle (not shown) is in operation. As can be further appreciated, biasing members 141, 142 can also be included to aid in compensating for centrifugal force. In one embodiment, biasing member 141 is a less powerful ferrite magnet, and biasing member 142 is a less powerful magnet as compared to biasing member 141 so as to gradually build up the biasing force of biasing members 140, 141, 142 as electricity generating wheel 100 is rotated. In alternate embodiments of wheel 100 an alternate number of biasing members 140, 141, 142 can be included and additional biasing member(s) can be included on the forward portion of electricity generating wheel 100 (i.e., to the right of biasing member 140 as oriented in FIG. 4) to gradually decrease the biasing force of biasing members 140, 141, 142. Similarly, a greater or lower number of forward biasing members can also be included.

FIG. 5 is a front view of the embodiment of electricity generating wheel 100 shown in FIG. 4. Vehicle 200, which includes fender 210 and tire 220 can also be appreciated, as well as the position of biasing member 140. In one embodiment, within hub 130 is rotatable wheel conducting rod 150, which rotates along with electricity generating wheel 100 when in operation. Each electrical wire (as shown in FIG. 2) is electrically connected to rotatable wheel conducting rod 150. Rotatable wheel conducting rod 150 can be made of any electrically conducting material as long as it is more conducting than the material chosen for hub 130.

Also visible is fixed conducting rod 250, which is part of vehicle 200. Fixed conducting rod 250 can be a component of vehicle 200 when vehicle is constructed or can be added later. Fixed conducting rod 250 is in electrical contact with rotatable wheel conducting rod 150. That is, fixed conducting rod 250 and rotatable wheel conducting rod 150 can physically touch one another, can be close enough to one another such that an electric arc passes therebetween, or can include a conductive lubricant therebetween. Fixed conducting rod 250 can similarly be made of any conductive material. Electrically connected to fixed conducting rod 250 is wire 225, which can be connected to any electrical system. In the embodiment shown, wire 225 is connected to a battery in an electric or hybrid car, but can alternately be connected to the electrical components of any vehicle, can be used to run or supplement a refrigeration system, running lights, or operate or supplement any electrical system, including non-vehicular uses such as the operating lights on a boat or decorative lights on a bicycle. In addition, the electrical energy can alternately be stored in a capacitor (not shown) and used to run any electrical system. Thus, the current generated by translatable magnet 126 passing through coil wire 124 within electricity generating device 120 thus passes through the electric wire (not shown, see FIG. 1), rotatable wheel conducting rod 150, all of which rotate, to fixed conducting rod 250, wire 225, and one or more electrical components, which do not rotate, to operate or supplement the operation of any electrical system.

Figure 6:
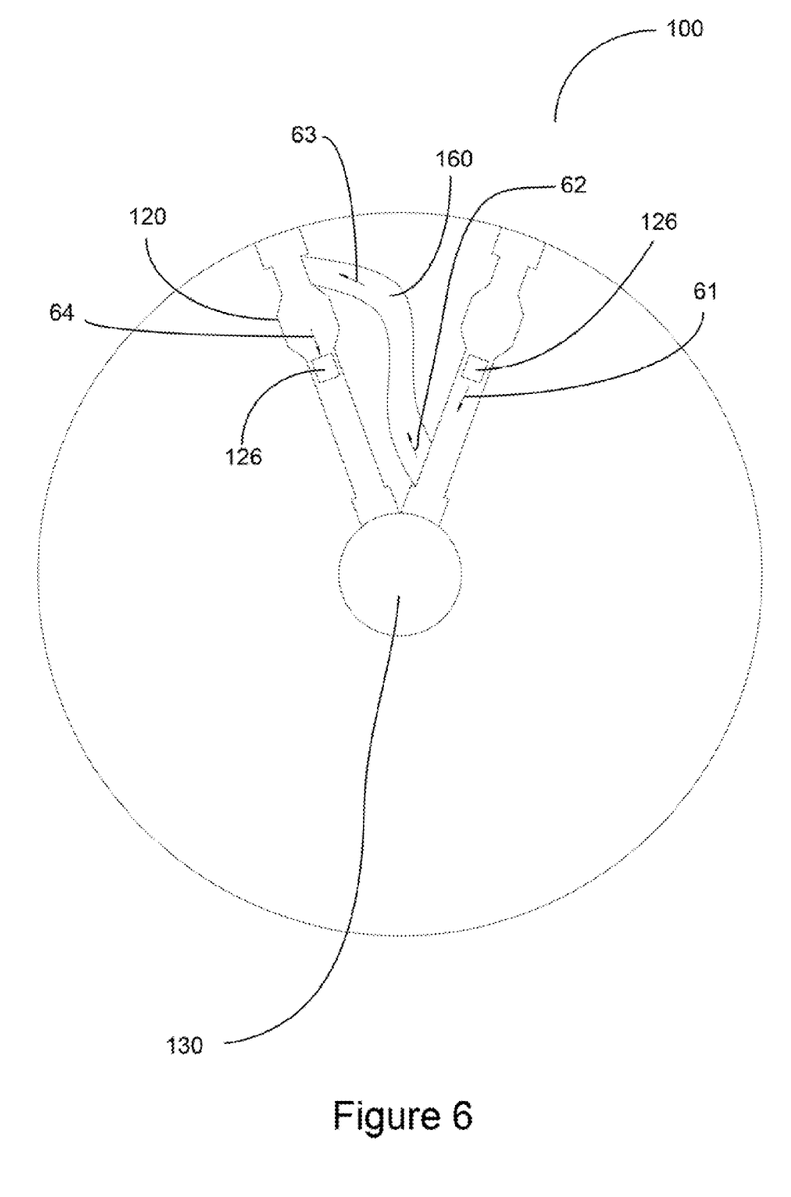
FIG. 6 is a side view of an alternate embodiment of an electricity generating wheel including fluid tubes between electricity generating devices.

FIG. 6 is a side view of an alternate embodiment of electricity generating wheel 100 including fluid tubes 160 between each electricity generating device 120. For ease of demonstration, only a simplified version of two (2) electricity generating devices 120 is shown. Between each electricity generating device 120 is one (1) fluid tube 160. Fluid tube 160 allows a fluid to pass between each electricity generating device 120. Thus, when electricity generating wheel 100 is rotating, as each electricity generating device 120 begins its descent (i.e., forward rotation past the uppermost position), as translatable 126 magnet moves within its respective electricity generating device 120, along arrow 61, it will push fluid through fluid tube 160, along arrows 62 and 63, to the next electricity generating device 120. The additional fluid entering electricity generating device 120 will help bias translatable magnet 126 toward hub 130, in the direction of arrow 64, when electricity generating wheel 100 is operated at high rpm's. As defined supra, "fluid" refers to any substance that is capable of flowing, whether a liquid, gas, slurry of liquids and solids, liquids and gasses, aerosols, and combinations of liquids, gasses, and solids. In the embodiment shown in FIG. 6, fluid tube 160 is made of plastic so as not to interfere with the magnet fluxes of translatable magnets 126 or any of the biasing members (not shown) as described supra or add any unnecessary weight to electricity generating wheel 100. However, fluid tube 160 can be made of any material capable of allowing the fluid to pass through it, including metals, metal alloys, and plastics. In addition, in certain applications and rotational rates, the position of fluid tube 160 could be reversed such that fluid tube 160 would be connected at the top of the forward electricity generating device 120 and at the bottom of the rear electricity generating device 120.

Figure 7:
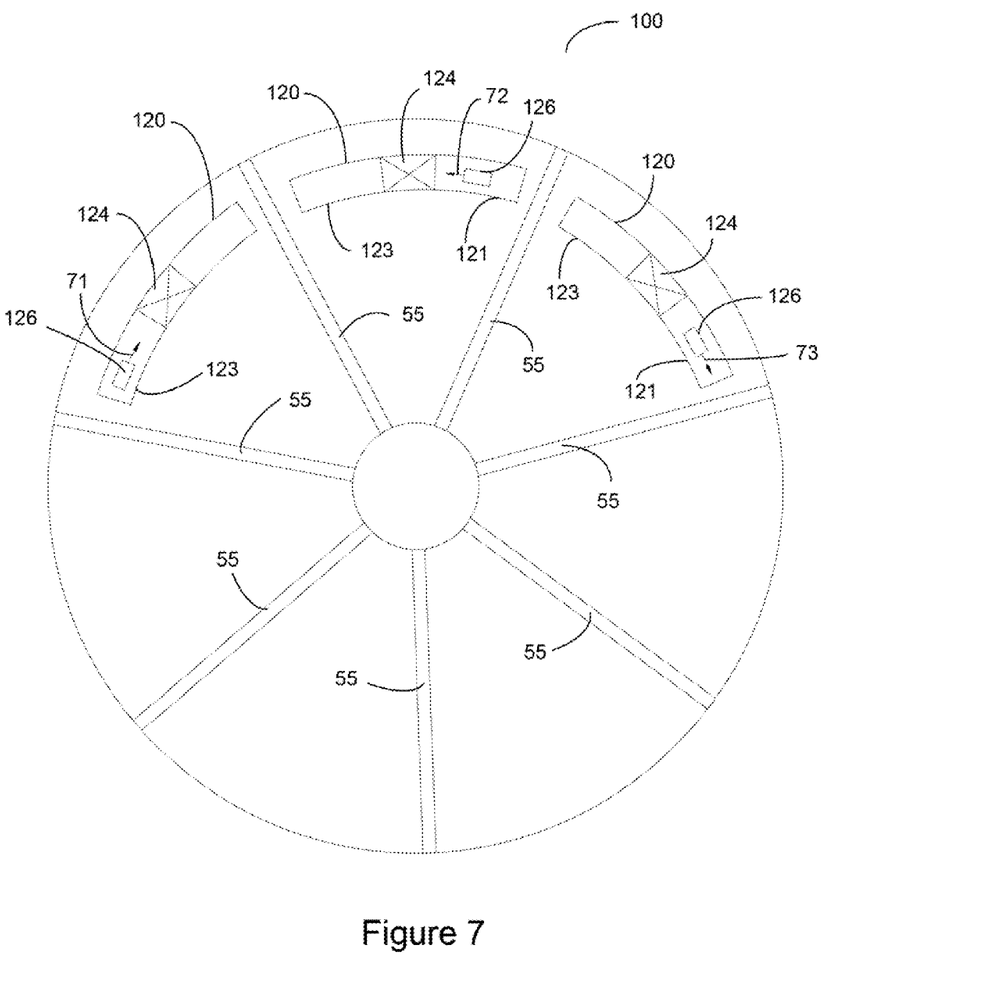
FIG. 7 is a side view of another alternate embodiment of an electricity generating wheel in which each electricity generating device is positioned parallel to the outer circumference of the wheel.

FIG. 7 is a side view of another alternate embodiment of an electricity generating wheel 100 in which each electricity generating device 120 is positioned parallel to the outer circumference of electricity generating wheel 100. For demonstrative purposes, FIG. 7 shows only a simplified version of electricity generating devices 120 in which each electricity generating device 120 is positioned between two (2) spokes 55. Beginning with the left-most electricity generating device 120, as electricity generating wheel 100 rotates in the direction of arrow A (clockwise as shown), translatable magnet 126 is pulled through wire coil 124 towards magnet 140 (along arrow 71), creating an electric current, which is drawn away to the vehicle (not shown) as described supra via an electrical wire (not shown). As electricity generating device 120 passes magnet 140, translatable magnet is drawn backwards toward magnet 140 (along arrow 72), again passing through wire coil 124 and again generating additional electric current. Finally, as electricity generating wheel 100 continues to rotate (see the third position of electricity generating device 120), translatable magnet 126 will fall through wire coil 124 (along arrow 73) and again fall through wire coil 124 as electricity generating device 120 ascends (prior to the first position of electricity generating device 120 shown). Thus, translatable magnet will pass through coil wire 124 four (4) times per rotation of electricity generating wheel 100. However, at higher rpm's, translatable magnet 126 may be pinned against second end 123 of electricity generating device 120. In such instances, translatable magnet 126 will not fall, but will still be moved by magnet 140, resulting in translatable magnet passing through wire coil 124 only two (2) times per rotation, but still generating electricity.

In the embodiment shown, each electricity generating device 120 is slightly arcuately shaped. That is, each electricity generating device 120 roughly runs parallel to the inner surface of the rim (not shown). However, it should be understood that electricity generating devices 120 could also be flat.

Figure 8A:
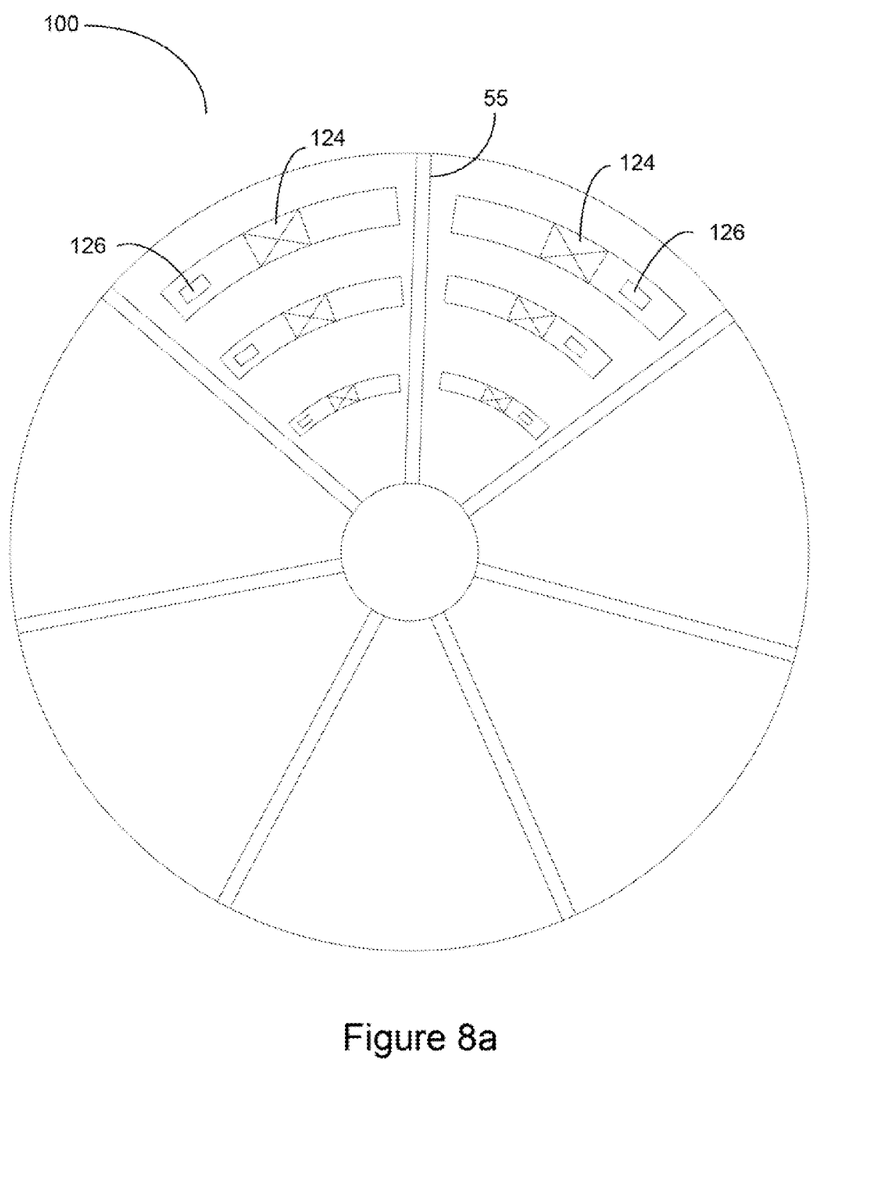
FIG. 8a is a side view of another alternate embodiment of an electricity generating wheel in which each electricity generating device is positioned parallel to the outer circumference of the wheel, but with multiple electricity generating devices between each spoke.

FIG. 8a is a side view of another alternate embodiment of electricity generating wheel 100 in which each electricity generating device 120 is positioned parallel to the outer circumference of the wheel (as with the embodiment of electricity generating wheel 100 shown in FIG. 7), but with multiple electricity generating devices 120 between each spoke 55. Each electricity generating device 120 operates as described with respect to FIG. 7, but with three (3) electricity generating devices between each spoke 55, a greater amount of electric current is generated. It should be understood that although three (3) electricity generating devices 120 are shown between each spoke 55, a greater or fewer number of electricity generating devices 120 could be used. Moreover, each space between each spoke 55 need not have an identical number of electricity generating devices 120. For example, in one (1) embodiment of electricity generating wheel 100, one (1) space between spokes 55 has three (3) electricity generating devices 120, one (1) space between spokes 55 has one (1) electricity generating devices 120, and one (1) space between spokes 55 has zero (0) electricity generating devices 120. Such a configuration may be necessary for weight or balancing in some applications.

Figure 8B:
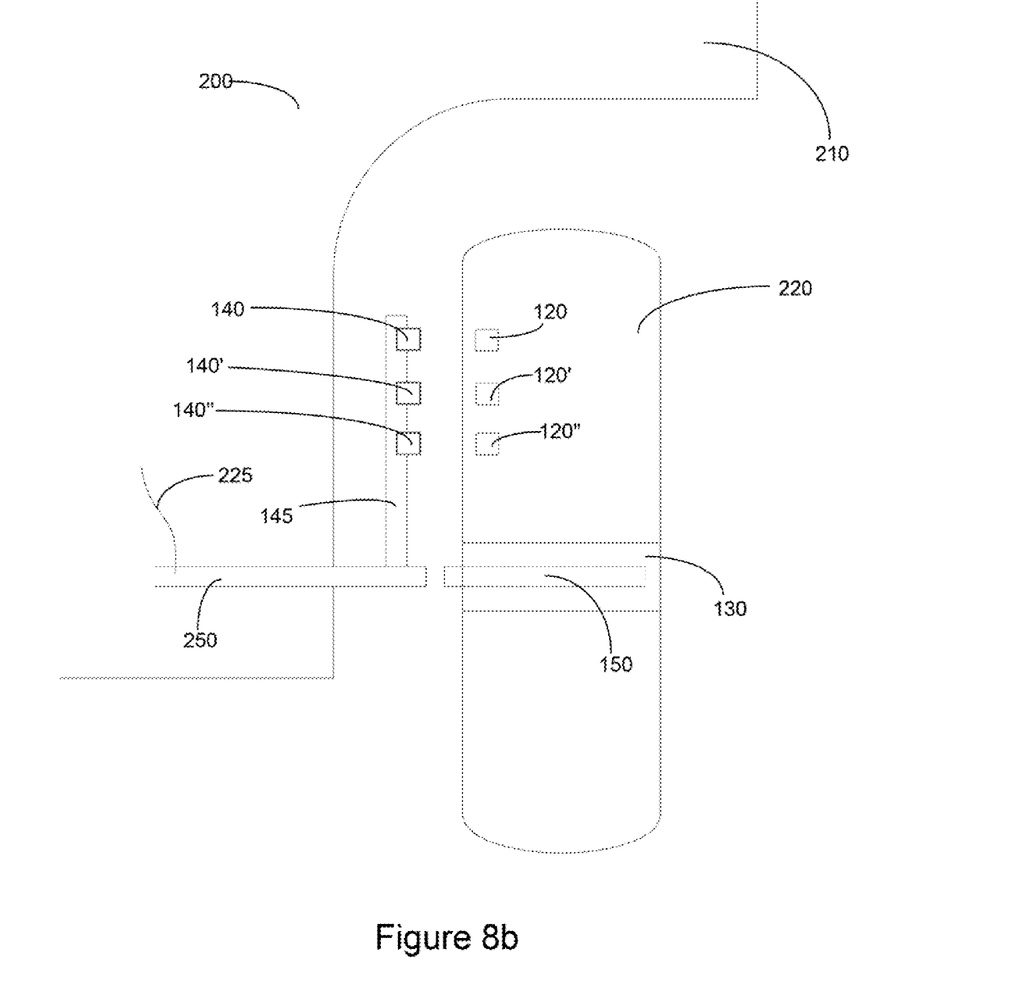
FIG. 8b is a front view of the embodiment of the electricity generating wheel shown in FIG. 8, taken along line 8-8.

FIG. 8b is a front view of the embodiment of electricity generating wheel 100 shown in FIG. 8a. Like the embodiment of electricity generating wheel 100 shown in FIG. 5, vehicle 200 can be appreciated, along with hub 130, fender 210, and fixed conducting rod 250 (all part of vehicle 200), as well as tire 220 and rotatable wheel conducting rod 150 (all part of a wheel, of which each electricity generating device 120 is part), along with the position of biasing members 140, 140', and 140". Fixed conducting rod 250 is in electrical contact with rotatable wheel conducting rod 150. As with the embodiment shown in FIG. 5, fixed conducting rod 250 and rotatable wheel conducting rod 150 can physically touch one another, can be close enough to one another such that an electric arc passes therebetween, or can include a conductive lubricant therebetween. Fixed conducting rod 250 can similarly be made of any conductive material. Electrically connected to fixed conducting rod 250 is wire 225, which can be connected to any electrical system.

As electricity generating wheel 100 rotates and each electricity generating device 120, 120', and 120" is also rotated as described with respect to FIG. 7, each electricity generating device 120 passes by one (1) corresponding magnet 140, 140', and 140", translating each translatable magnet (not shown). Thus, each translatable magnet moves within each electricity generating device 120, 120', 120" to create an electric current.

Figure 9:
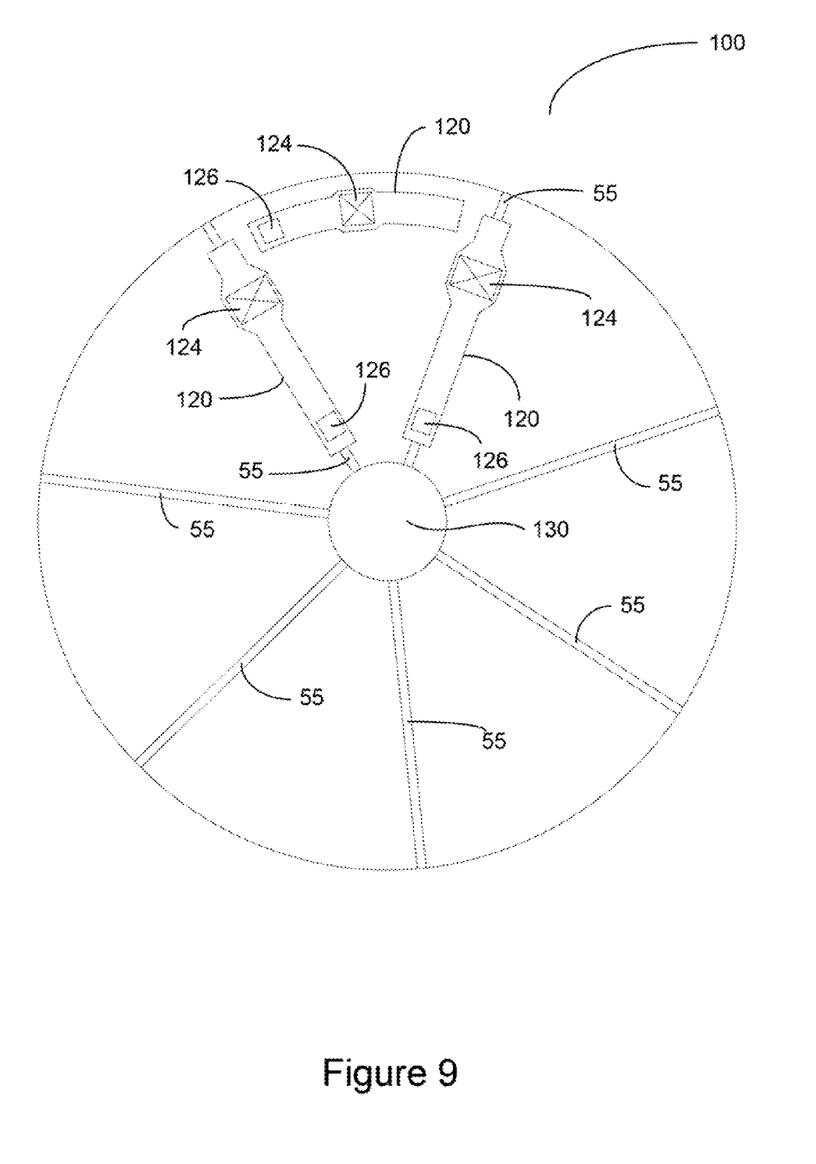
FIG. 9 is a side view of another alternate embodiment of an electricity generating wheel in which the electricity generating devices are positioned both along the spokes and parallel to the outer circumference of the wheel.

FIG. 9 is a side view of another alternate embodiment of electricity generating wheel 100 in which two (2) embodiments of electricity generating device 120 are employed and positioned both along spokes 55 and parallel to the wheel rim (not shown), i.e., perpendicular to those electricity generating devices 120 that are positioned along spokes 55. For simplicity, only three (3) electricity generating devices 120 are shown, but other electricity generating devices 120 would be positioned along each spoke 55 and perpendicularly between each spoke 55. In this embodiment, each electricity generating device 120 is electrically connected to the vehicle (not shown) as above and there is a greater number of electricity generating devices 120 employed as compared to the amount of electricity generated by the embodiment shown in FIG. 7, for example. Furthermore, it should be understood that multiple electricity generating devices 120 can be positioned between each spoke 55, as with the embodiment of electricity generating wheel 100 shown in FIGS. 8a and 8b.

Figure 10A:
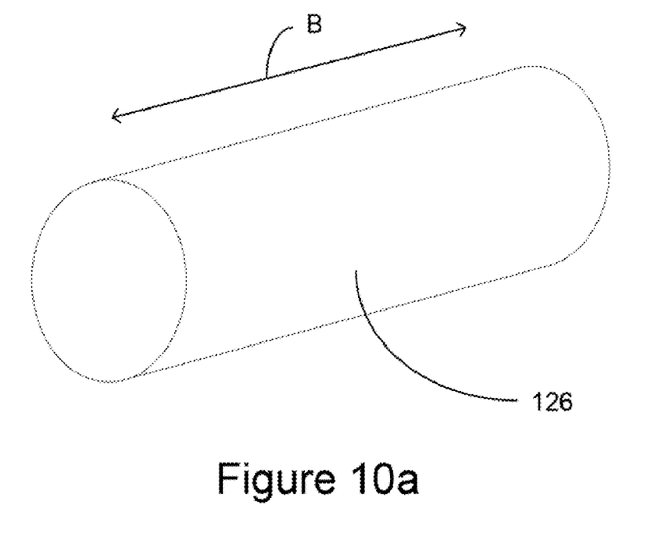
FIGS. 10a and 10b are perspective views of two embodiments of the translatable magnet.
Figure 10B:
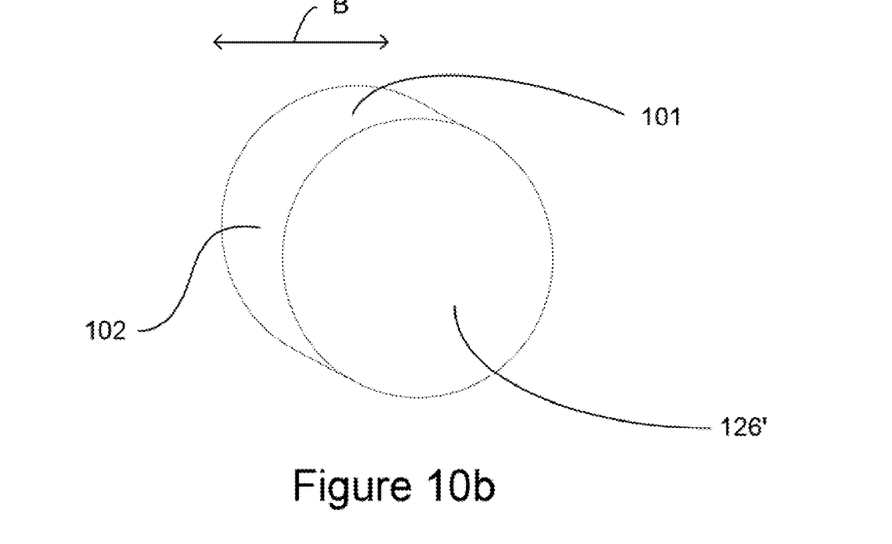

FIGS. 10a and 10b are perspective views of two (2) embodiments of translatable magnet 126, 126'. In the embodiments shown and described supra, each embodiment has included a cylindrically-shaped translatable magnet 126, which corresponds to the shape of the electricity generating device (not shown). FIG. 10a shows the cylindrically-shaped translatable magnet 126, which moves back and forth, in the direction of arrow B, within the electricity generating device. However, FIG. 10b shows an alternate embodiment of translatable magnet 126' in which translatable magnet 126' is disc-shaped. In such an embodiment, rather than sliding (as the embodiment of translatable magnet 126 shown in FIG. 10a does), the disc-shaped translatable magnet 126' shown in FIG. 10b rolls within the housing (not shown; refer to FIG. 2)

of the electricity generating device. In such an embodiment, the shape of the housing should be similarly shaped, i.e., have a rectangular cross-section.

Figure 10C:
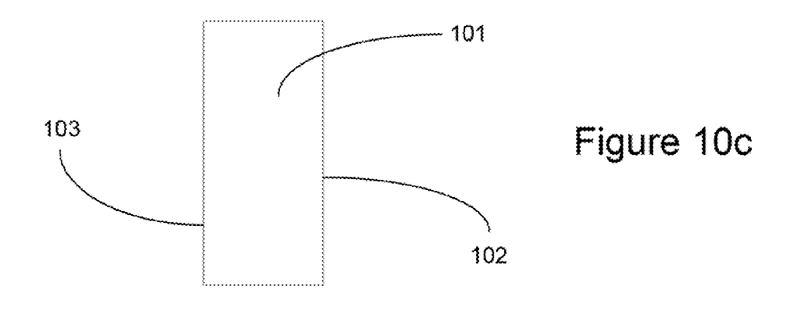
FIG. 10c is a cross-section of the embodiment of the translatable magnet shown in FIG. 10b.
Figure 10D:
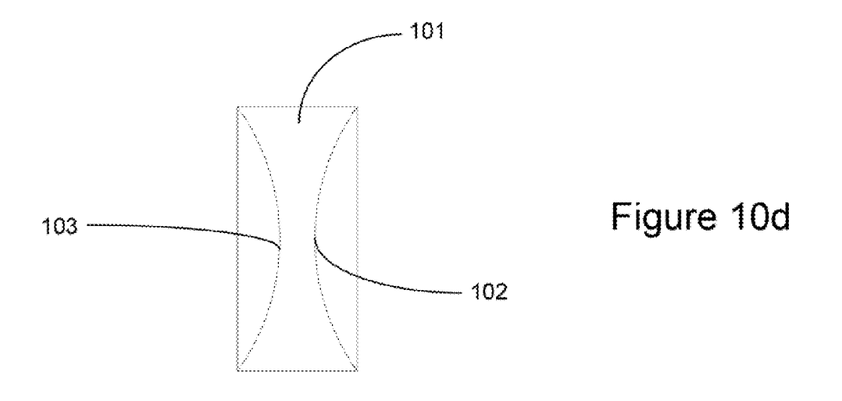
FIGS. 10d and 10e show cross-sectional views of alternately shaped translatable magnets as compared to the embodiment shown in FIG. 10b.
Figure 10E:
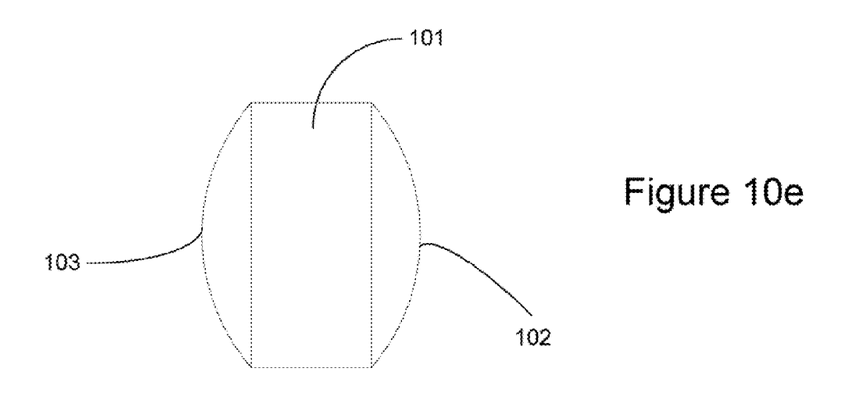

FIG. 10c is a cross-section of the embodiment of the translatable magnet shown in FIG. 10b. As can be seen, translatable magnet 126' includes rounded surface 101 and two (2) substantially flat side surfaces 102, 103. However, in alternate embodiments of translatable magnet 126', side surfaces can be alternate shapes, including concave (as shown in FIG. 10d) and convex (as shown in FIG. 10e). Taking the embodiment shown in FIG. 10 even further, translatable magnet 126' can even be spherical. Again, however, the housing of the electricity generating device should be shaped to accommodate the shape of translatable magnet 126'. That is, the cross-section of the housing should be similar to the cross-section of the translatable magnet 126' used within it.

Figure 11:
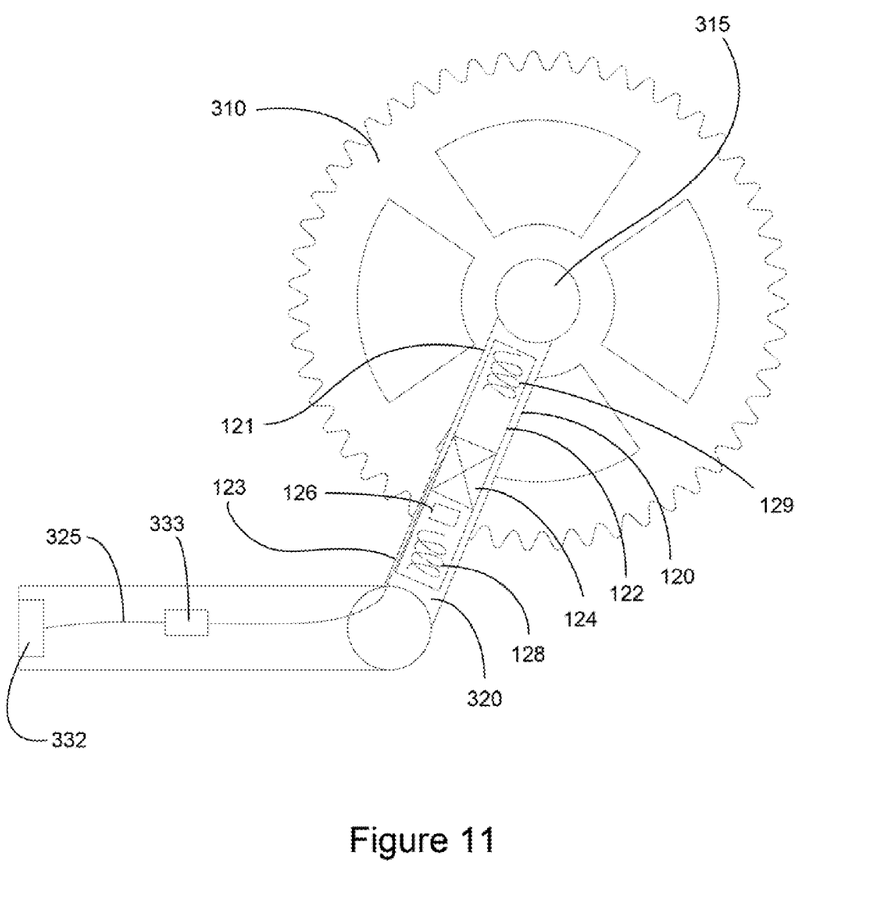
FIG. 11 is a side view of an alternate embodiment of the electricity generating device for use with a bicycle.

FIG. 11 is a side view of an alternate embodiment of electricity generating device 120 for use with a bicycle. As is standard on a bicycle, sprocket 310, pedal 330, and arm 320, which connects pedal 330 to sprocket 310 can all be appreciated. Positioned on arm 320 is electricity generating device 120, though a simplified version is shown for demonstrative purposes. As can be seen, the simplified depiction of electricity generating device 120 includes housing 122, wire coil 124, translatable magnet 126, biasing member 129 at first end 121, and biasing member 128 at second end 123 of housing 122. In the position shown, translatable magnet 126 is positioned at second end 128 of housing 122. As bicycle is operated and pedal 330 circles around sprocket 310, pedal 330 will be positioned above arm 320. Once the height of pedal 330 is above sprocket center 315, translatable magnet 126 will fall through the length of housing 122, passing through wire coil 124 and generating an electric current, as described supra. That electric current can be delivered to light 332 positioned in pedal 330 via wire 325. It should also be understood that electricity generating device 120 could alternately be positioned directly on sprocket 310 and/or that light 332 could be positioned on the side of pedal 330 or elsewhere in the bike. In addition, wire 325 could be connected to one (1) or more lights on sprocket 310 or elsewhere on the bike (not shown) to create alternate light patterns. In another embodiment, the electricity generated from pedaling the bike can be stored in capacitor 330 and used to illuminate light 332 when the operator of the bike is not pedaling.

While the electricity generating wheel and device for capturing otherwise unused and wasted energy created by the spinning of a wheel has been shown and described with respect to several embodiments and uses in accordance with the present invention, it is to be understood that the same is not limited thereto, but is susceptible to numerous changes and modifications as known to a person of ordinary skill in the art, and it is intended that the present invention not be limited to the details shown and described herein, but rather cover all such changes and modifications obvious to one of ordinary skill in the art.

What is claimed is:

1. A system for capturing electricity comprised of:
   a wheel, said wheel being rotatable about an axis and comprise of:
      a rotatable hub, also rotatable about said axis; and
      a rotatable conducting rod within said rotatable hub, said rotatable conducting rod also rotatable about said axis;
   at least one electricity generating device positioned in said wheel, said at least one electricity generating device comprised of:
      a generally hollow housing, said housing having a first end and a second end;
      a wire coil fixed within said housing, said wire coil having an axial bore there through;
      a first movable magnet within said housing; and
      at least one first wire, said at least one first wire in electrical contact with said wire coil and said rotatable hub;
   a second magnet located within said housing which operates as a repelling magnet;
   a fixed conducting rod in electrical contact with said rotatable conducting rod;
   at least one second wire, said at least one second wire in electrical contact with said fixed conducting rod and is capable of being electrically connected to at least one electrical component;
   wherein as said wheel is rotated about said axis, said first movable magnet laterally translates within said housing, passing through said axial bore of said wire coil to generating electric current for operating at least one of said at least one electrical; and
   at least one fluid tube between each of said at least one electricity generating device, each of said at least one fluid tube allowing a fluid to pass between a first of said at least one electricity generating device and a second of said at least one electricity generating device to help translate said first movable magnet;
   wherein said fluid is selected from a group consisting of a liquid, a gas, a slurry of one or more liquids and solids, a liquid and a gas, an aerosol, and combinations thereof.

2. The system of claim 1, wherein said wheel is selected from a group consisting of a car tire, a truck tire, a motorcycle tire, a moped tire, an ATV tire, a bicycle tire, a sprocket, an axle, a windmill, a tan, a waterwheel, a paddlewheel, a sprocket, and combinations thereof.

3. The system of claim 1, wherein said system further includes a first biasing member positioned within said first end of said housing of each of said at least one electricity generating device and a second biasing member positioned within said second end of said housing of each of said at least one electricity generating device, said first biasing member and said second biasing member further supporting said first movable magnet laterally moving within said housing of said at least one electricity generating device.

4. The system of claim 1, wherein said system further includes at least one biasing member, said at least one biasing member positioned outside of said electricity generating device, said at least one biasing member capable of preventing said first movable magnet from being pinned against said second end of said housing when said system is operated at a high rate of revolution.

5. The system of claim 1, wherein said first movable magnet has a shape selected from a group consisting of a cylinder, a disc, and a sphere.

6. The system of claim 5, wherein said housing of said at least one electricity generating device has a cross-sectional area which corresponds with a cross-sectional area of said first movable magnet.

7. The system of claim 1, wherein said first movable magnet is selected from a group consisting of a ferrite magnet, an anistotropic sintered ceramic containing neodymium and boron, an anistotropic sintered ceramic containing neodymium, iron, and boron, a samarium-cobalt alloy, a sintered rare earth magnet, a sintered hard ferrite/ceramic bonded magnet, an alnico magnet, an aluminum, nickel, cobalt alloy, a ceramic magnet, a flexible magnet, a magnet assembly, and combinations thereof.

8. A device comprised of:
a wheel, said wheel being rotatable about an axis and comprised of:
a rotatable hub, also rotatable about said axis;
a rotatable conducting rod within said rotatable hub, said rotatable conducting rod also rotatable about said axis;
at least one electricity generating device positioned on said wheel, each of said at least one electricity generating device comprised of:
a generally hollow housing, said housing having a first end and a second end;
a wire coil fixed within said housing, said wire coil having an axial bore there through;
a first movable magnet within said housing;
a first biasing member positioned within said first end of said housing;
a second biasing member positioned within said second end of said housing, said first biasing member and said second biasing member capable of aiding said first movable magnet in moving within said housing; and
at least one first wire, said at least one first wire in electrical contact with said wire coil and said rotatable hub;
a second magnet located within said housing which operates as a repelling magnet;
a fixed conducting rod in electrical contact with said rotatable conducting rod;
at least one second wire, said at least one second wire in electrical contact with said fixed conducting rod and is capable of being electrically connected to at least one electrical component;
wherein as said wheel is rotated about said axis, said first movable magnet laterally moves within said housing, passing through said axial bore of said wire coil to generate an electric current for operating at least one of said at least one electrical component; and
at least one fluid tube between each of said at least one electricity generating device, each of said at least one fluid tube allowing a fluid to pass between a first of said at least one electricity generating device and a second of said at least one electricity generating device to help translate said first movable magnet;
wherein said fluid is selected from a group consisting of a liquid, a gas, a slurry of one or more liquids and solids, a liquid and a gas, an aerosol, and combinations thereof.

9. The device of claim 8, wherein said wheel is selected from a group consisting of a car tire, a truck tire, a motorcycle tire, a moped tire, an ATV tire, a bicycle tire, a sprocket, an axle, a windmill, a fan, a waterwheel, a paddlewheel, a sprocket, and combinations thereof.

10. The device of claim 8, wherein said device further includes at least one additional biasing member, said at least one additional biasing member positioned outside of said electricity generating device, said at least one additional biasing member capable of preventing said first movable magnet from being pinned against said second end of said housing when said device is operated at a high rate of revolution.

11. The device of claim 8, wherein said first movable magnet has a shape selected from a group consisting of a cylinder, a disc, and a sphere.

12. The device of claim 11, wherein said housing of said at least one electricity generating device has a cross-sectional area which corresponds with a cross-sectional area of said first movable magnet.

13. The device of claim 8, wherein said first movable magnet is selected from a group consisting of a ferrite magnet, an anistotropic sintered ceramic containing neodymium and boron, an anistotropic sintered ceramic containing neodymium, iron, and boron, a samarium-cobalt alloy, a sintered rare earth magnet, a sintered hard ferrite/ceramic bonded magnet, an alnico magnet, an aluminum, nickel, cobalt alloy, a ceramic magnet, a flexible magnet, a magnet assembly, and combinations thereof.

14. An electricity generating device capable of being positioned on a wheel for capturing otherwise wasted energy produced by rotation of said wheel comprised of:
a generally hollow housing, said housing having a first end and a second end;
a wire coil fixed within said housing, said wire coil having an axial bore there through;
a first movable magnet within said housing;
at least one first wire, said at least one first wire capable of being electrically connected to at least one electrical component;
wherein as said wheel is rotated, said first movable magnet laterally translates within said housing, passing through said axial bore of said wire coil to generate an electric current for operating at least one electrical component;
a second magnet located within said housing which operates as a repelling magnet at least one fluid tube between each of said housing, each of said at least one fluid tube allowing a fluid to pass between a first of said housing and a second of said housing to help translate said first movable magnet;
wherein said fluid is selected from a group consisting of a liquid, a gas, a slurry of one or more liquids and solids, a liquid and a gas, an aerosol, and combinations thereof.

15. The device of claim 14, wherein said wheel is selected from a group consisting of a car tire, a truck tire, a motorcycle tire, a moped tire, an ATV tire, a bicycle tire, a sprocket, an axle, a windmill, a fan, a waterwheel, a paddlewheel, a sprocket, and combinations thereof.

16. The device of claim 14, wherein said system further includes a first biasing member positioned within said first end of said housing of each of said at least one electricity generating device and a second biasing member positioned within said second end of said housing of each of said at least one electricity generating device, said first biasing member and said second biasing member further supporting said first movable magnet laterally moving within said housing of said at least one electricity generating device.

17. The device of claim 14, wherein said first movable magnet has a shape selected from a group consisting of a cylinder, a disc, and a sphere.

18. The device of claim 17, wherein said housing of said at least one electricity generating device has a cross-sectional area which corresponds with a cross-sectional area of said first movable magnet.

19. The device of claim 14, wherein said first movable magnet is selected from a group consisting of a ferrite magnet, an anistotropic sintered ceramic containing neodymium and boron, an anistotropic sintered ceramic containing neodymium, iron, and boron, a samarium-cobalt alloy, a sintered rare earth magnet, a sintered hard ferrite/ceramic bonded magnet, an alnico magnet, an aluminum, nickel, cobalt alloy), a ceramic magnet, a flexible magnet, a magnet assembly, and combinations thereof.

* * * * *